Sept. 25, 1934.     B. GRAWOIG     1,974,813
PIPE BUSHING
Filed Sept. 1, 1933
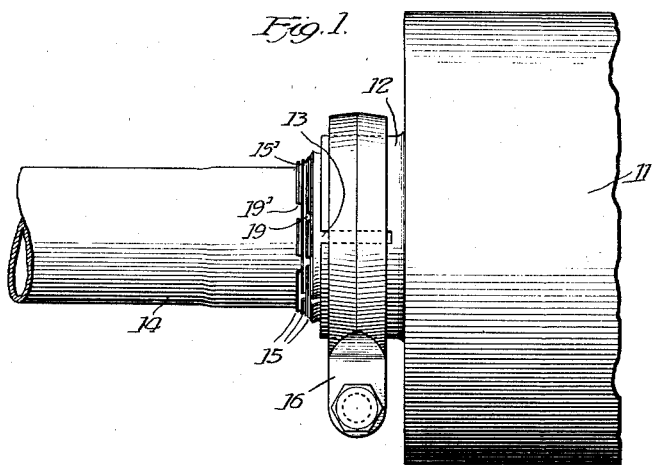
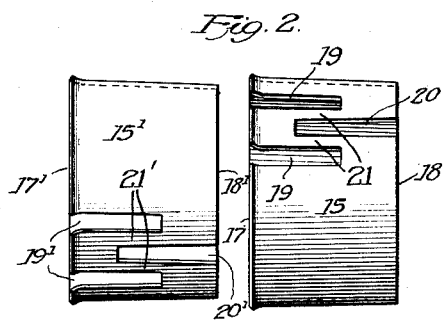
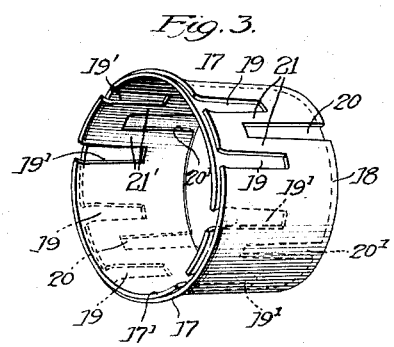
Inventor,
Barney Grawoig Patented Sept. 25, 1934

1,974,813

UNITED STATES PATENT OFFICE 1,974,813

PIPE BUSHING

Barney Grawoig, Chicago, Ill., assignor to Universal Parts Mfg. Corp., Chicago, Ill., a corporation of Illinois Application September 1, 1933, Serial No. 687,808

4 Claims. (Cl. 285—183)

My invention has for its primary object the provision of a collar or bushing unit of a compensating character, adaptable to fittings of diverse size by its capacity for being contracted and expanded; and useable either singly or in multiple as a bushing for effecting a leak-proof coupling between pipes of different size, such as between a standardized engine muffler and the different diameter exhaust pipes found in various makes of cars.

It has been proposed heretofore to utilize in such situations a nested group of bushing rings of progressive size, each split transversely to permit of contraction under the force of a clamping collar. Such, however, present a channel through the split, however tortuous, and permit of gas leakage unless the fitting is so perfect as to be impracticable of attainment.

By my invention I attain much better flexibility and contractibility in a sheet metal ring while maintaining an integrally continuous structure without any openings which by any possibility could permit of leakage.

I accomplish this by the employment of closed end slots, which slots are preferably disposed in parallel spaced relation as viewed circumferentially and open alternately to opposite sides of the bushing element or ring, the closed ends of the slots overlapping the median plane of the ring. These slots may be arranged in two or more groups spaced about the periphery of the ring in such manner as to equalize the susceptibility to contraction and expansion about the entire bushing; and when nested, the several groups of slots of the different bushings are preferably staggered to prevent registration of the slots in adjacent rings.

In order to make clear the construction and functioning of the invention, a preferred embodiment of the same is set forth by way of illustration only in the accompanying drawing wherein—

Fig. 1 is a fragmentary view of a muffler and exhaust pipe coupling embodying the invention;

Fig. 2 is a side elevation of two bushing elements; and

Fig. 3 is a perspective view of the two elements of Fig. 2 in nested relation.

Having reference to the drawing, the numeral 11 designates one end of a standard muffler, and 12 the muffler neck, which is slotted at 13. An exhaust pipe terminal 14 is coupled with the neck 12 of the muffler by the insertion therebetween of a group of bushing elements 15, the slot 13 of the neck 12 permitting the circumferential clamping of the assembled pipe, muffler and bushing elements by a split collar 16.

The bushing elements 15 are in the form of continuous sheet metal bands or rings, as most clearly shown in Fig. 2, which rings are preferably somewhat flared at one edge 17 and cylindrical throughout the main body and at the other edge 18. The bushing elements being identical, a detailed description of one will suffice. Each ring is provided with slots which extend inwardly from both edges and are preferably arranged in groups of three, with the groups equally distributed about the circumference of the ring. One group may consist of a pair of parallel slots 19 opening to the edge 17 of the ring and a slot 20 opening to the edge 18 and extending inwardly between the slots 19 and slightly spaced therefrom, the slots being so extended that at their closed ends they overlap the median plane of the ring and consequently have an overlapping relation with respect to each other. Narrow bridge-like sections 21 are formed in the ring between the overlapping portions of adjacent slots. These bridge sections—which are called upon to absorb by distortion the increase or decrease in ring circumference occasioned by expansion or contraction—are preferably about the same width as the slots, and are also preferably quite a bit longer than they are wide.

It will be observed that this arrangement of slots permits of circumferential contraction of the ring by the flexing of the ring material between the overlapping portions of the spaced slots as well as by the flexing of the slotted walls adjacent the ring edge to which they open; and that by distributing groups of slots about the ring circumference, contractibility is imparted to the ring as a whole.

While the several bushing rings are identical in construction, yet they are furnished in sets of progressively varying diameter so that they may be nested snugly within each other.

The element shown at the right in Fig. 2 may be considered as slightly larger in diameter than the companion element shown at the left whereby that at the left may be inserted within the one at the right with the result illustrated in Fig. 3, the corresponding details of the smaller ring being numbered 15′, 17′, 18′, 19′, 20′ and 21′ in order to maintain their identity in the assembled relation of Fig. 3.

When nested as indicated in Fig. 3 it will be observed that the slots 19′ and 20′ of the element 15′ are disposed in staggered relation out of register with the corresponding slots 19 and 20 of the element 15 and that where several of these bushing elements are nested in this manner between the terminal portion of the pipe 14 and the muffler neck 12 and clamped therebetween by the member 16, there will be a snug surface fit between the several bushing elements and absolutely no possibility of gas leakage by way of the slots which provide contractibility.

It will thus be appreciated that my invention provides a bushing element which is adapted to be nested with other like elements for the purpose of effecting a coupling between pipes of dissimilar size; that the element is susceptible of contraction and expansion within a considerable range and presents no transverse throughway for the leakage of liquid or gaseous fluid; and that, being an integrally continuous structure, it is not dependent upon any fine accuracy in assemblage to insure a leak-proof coupling.

I claim:

1. A coupling element for pipes of different diameters comprising a generally cylindrical continuous sheet metal band of substantially uniform thickness provided with two or more segregated groups of slots disposed with the slots in each group in adjacent relation, the adjoining slots in each group entering the ring from opposite edges of the latter, with the inner ends of said slots in overlapping relation, and with the unslotted portions of the band between the groups of slots of greater circumferential extent than the slotted portions.

2. A coupling for holding the telescoped ends of non-fitting tubular members in sealed relation, comprising a nest of graduated bushings for insertion in the annular space present between said telescoped ends, each of said bushings having a snug surface fit throughout substantially its full length with either the inside or the outside of one of the other bushings, and being made in the form of a continuous sheet metal band of substantially uniform thickness, with cut-outs in the band which provide for contraction without interrupting the continuity of the same.

3. A coupling for holding the telescoped ends of non-fitting tubular members in sealed relation, comprising a nest of graduated bushings for insertion in the annular space present between said telescoped ends, each of said bushings having a snug surface fit throughout substantially its full length with either the inside or the outside of one of the other bushings, and being made in the form of a continuous sheet metal band of substantially uniform thickness, with closely arranged slots which enter the band from opposite edges of the latter, and with the inner ends of the slots lapped in offset relation to form therebetween a narrow readily yieldable bridge-like section.

4. A coupling for holding the telescoped ends of non-fitting tubular members in sealed relation, comprising a nest of graduated bushings for insertion in the annular space present between said telescoped ends, each of said bushings having a snug surface fit throughout substantially its full length with either the inside or the outside of one of the other bushings, and being made in the form of a continuous sheet metal band, with closely arranged slots which enter the band from opposite edges of the latter, and with the inner ends of the slots lapped in offset relation to form therebetween a narrow readily yieldable bridge-like section, and each of said bushings being also conically flared inside and out at one end, with the flared portion terminating short of the ends of the slots entering from the other end of the bushing.

BARNEY GRAWOIG.